US010531086B2

(12) United States Patent
Tsai et al.

(10) Patent No.: US 10,531,086 B2
(45) Date of Patent: *Jan. 7, 2020

(54) RESIDUAL TRANSFORMATION AND INVERSE TRANSFORMATION IN VIDEO CODING SYSTEMS AND METHODS

(71) Applicant: RealNetworks, Inc., Seattle, WA (US)

(72) Inventors: Chia-Yang Tsai, Seattle, WA (US); Wenpeng Ding, Seattle, WA (US); Gang Wu, Seattle, WA (US)

(73) Assignee: RealNetworks, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/216,501

(22) Filed: Dec. 11, 2018

(65) Prior Publication Data

US 2019/0110050 A1 Apr. 11, 2019

Related U.S. Application Data

(63) Continuation of application No. 15/562,811, filed as application No. PCT/CN2015/075597 on Mar. 31, 2015, now Pat. No. 10,218,974.

(51) Int. Cl.
H04N 19/122 (2014.01)
H04N 19/82 (2014.01)
(Continued)

(52) U.S. Cl.
CPC ......... H04N 19/122 (2014.11); H04N 19/115 (2014.11); H04N 19/176 (2014.11);
(Continued)

(58) Field of Classification Search
None
See application file for complete search history.

(56) References Cited

U.S. PATENT DOCUMENTS 9,438,915 B1 * 9/2016 Bultje ............... H04N 19/60
10,218,974 B2 * 2/2019 Tsai ................. H04N 19/50
(Continued)

FOREIGN PATENT DOCUMENTS

CN 101822057 A 9/2010
CN 102763411 A 10/2012
(Continued)

OTHER PUBLICATIONS

Panusopone et al., "Efficient Transform Unit Representation," JCTVC-D250, *Joint Collaborative Team on Video Coding (JCT-VC) of ITU-T SG16 WP3 and ISO/IEC JTC1/SC29/WG11*, Daegu, South Korea, Jan. 20-28, 2011, 2 pages.
(Continued)

*Primary Examiner* — Mohammad J Rahman
(74) *Attorney, Agent, or Firm* — Seed IP Law Group LLP

(57) ABSTRACT

A transform block processing procedure wherein a maximum coding-block size and a maximum transform-block size for an unencoded video frame is determined. The unencoded video frame is divided into a plurality of coding-blocks including a first coding block and the first coding block is divided into at least one prediction block and a plurality of transform blocks. The size of the transform blocks depend at least in part on the size of the coding block and the corresponding prediction blocks. The transform blocks are then encoded, thereby generating a video data payload of an encoded bit-stream. A frame header of the encoded bit-stream, including a maximum coding-block-size flag and a maximum-transform-block-size flag, is generated.

19 Claims, 11 Drawing Sheets

(51) Int. Cl.
*H04N 19/61* (2014.01)
*H04N 19/50* (2014.01)
*H04N 19/115* (2014.01)
*H04N 19/182* (2014.01)
*H04N 19/18* (2014.01)
*H04N 19/176* (2014.01)
*H04N 19/436* (2014.01)

(52) U.S. Cl.
CPC ........... *H04N 19/18* (2014.11); *H04N 19/182* (2014.11); *H04N 19/436* (2014.11); *H04N 19/50* (2014.11); *H04N 19/61* (2014.11); *H04N 19/82* (2014.11)

(56) References Cited

U.S. PATENT DOCUMENTS

| | | | |
|---|---|---|---|
| 2003/0081838 | A1 | 5/2003 | Teng |
| 2008/0031363 | A1 | 2/2008 | Hong |
| 2008/0137753 | A1 | 6/2008 | He |
| 2009/0175349 | A1 | 7/2009 | Ye et al. |
| 2011/0135000 | A1 | 6/2011 | Alshina et al. |
| 2011/0317762 | A1 | 12/2011 | Sankaran |
| 2012/0230411 | A1 | 9/2012 | Liu et al. |
| 2013/0094572 | A1* | 4/2013 | Van der Auwera .... H04N 19/70 375/240.03 |
| 2013/0195199 | A1 | 8/2013 | Guo et al. |
| 2013/0343462 | A1 | 12/2013 | Li et al. |
| 2014/0079135 | A1* | 3/2014 | Van der Auwera .... H04N 19/70 375/240.18 |
| 2015/0245070 | A1 | 8/2015 | Sun et al. |
| 2016/0269730 | A1* | 9/2016 | Jeon ..................... H04N 19/176 |
| 2017/0180737 | A1 | 6/2017 | Ye et al. |

FOREIGN PATENT DOCUMENTS

| | | |
|---|---|---|
| CN | 103220529 A | 7/2013 |
| JP | 2000-165805 A | 6/2000 |
| JP | 2014-534755 A | 12/2014 |
| JP | 2015-508953 A | 3/2015 |
| JP | 2015-516770 A | 6/2015 |
| WO | 2010047492 A3 | 4/2010 |
| WO | 2013/067922 A1 | 5/2013 |
| WO | 2013/116081 A2 | 8/2013 |
| WO | 2013/158656 A2 | 10/2013 |

OTHER PUBLICATIONS

Sullivan et al., "Overview of the High Efficiency Video Coding (HEVC) Standard," *IEEE Transactions on Circuits and Systems for Video Technology* 22(12):1649-1668, 2012.

Wiegand et al., "WD1: Working Draft 1 of High-Efficiency Video Coding," JCTVC-C403, *Joint Collaborative Team on Video Coding (JCT-VC) of ITU-T SG16 WP3 and ISO/IEC JTC1/SC29/WG11*, Guangzhou, China, Oct. 7-15, 2010, 137 pages.

Wien, "Integer Transforms for Variable Block Size Transform Coding," *Picture Coding Symposium*, Saint Malo, France, Apr. 23, 2003, 6 pages.

Zhang et al., "Systematic Approach of Fixed Point 8×8 IDCT and DCT Design and Implementation," *Picture Coding Symposium*, Beijing, China, Apr. 24, 2006, 6 pages.

Zhou, "16 bit integer transform and quantization," Document No. VCEG-N022, *ITU—Telecommunications Standardization Sector: 14th Meeting of the Video Coding Experts Group*, Santa Barbara, California, USA, Sep. 10, 2001, 13 pages.

\* cited by examiner

RESIDUAL TRANSFORMATION AND INVERSE TRANSFORMATION IN VIDEO CODING SYSTEMS AND METHODS

TECHNICAL FIELD

This disclosure relates to encoding and decoding of video signals, and more particularly, to codebook-based encoding and decoding of adaptive filters used for impairments compensation.

BACKGROUND

The advent of digital multimedia such as digital images, speech/audio, graphics, and video have significantly improved various applications, as well as opened up brand new applications, due to the relative ease by which it has enabled reliable storage, communication, transmission, and, search and access of content. Overall, the applications of digital multimedia have been many, encompassing a wide spectrum including entertainment, information, medicine, and security, and have benefited society in numerous ways. Multimedia as captured by sensors such as cameras and microphones is often analog, and the process of digitization in the form of Pulse Coded Modulation (PCM) renders it digital. However, just after digitization, the amount of resulting data can be quite significant as is necessary to re-create the analog representation needed by speakers and/or TV display. Thus, efficient communication, storage, or transmission of the large volume of digital multimedia content requires its compression from raw PCM form to a compressed representation. Thus, many techniques for compression of multimedia have been invented. Over the years, video compression techniques have grown very sophisticated, to the point that they can often achieve high compression factors between 10 and 100 while retaining high psycho-visual quality, often similar to uncompressed digital video.

While tremendous progress has been made to date in the art and science of video compression (as exhibited by the plethora of standards bodies driven video coding standards such as MPEG-1, MPEG-2, H.263, MPEG-4 part2, MPEG-4 AVC/H.264, MPEG-4 SVC and MVC, as well as industry driven proprietary standards such as Windows Media Video, RealVideo, On2 VP, and the like), the ever increasing appetite of consumers for even higher quality, higher definition, and now 3D (stereo) video, available for access whenever, wherever, has necessitated delivery via various means such as DVD/BD, over the air broadcast, cable/satellite, wired and mobile networks, to a range of client devices such as PCs/laptops, TVs, set top boxes, gaming consoles, portable media players/devices, smartphones, and wearable computing devices, fueling the desire for even higher levels of video compression. In the standards-body-driven standards, this is evidenced by the recently started effort by ISO MPEG in High Efficiency Video Coding (HVEC), which is expected to combine new technology contributions and technology from a number of years of exploratory work on H.265 video compression by the ITU-T standards committee.

All aforementioned standards employ a general inter-frame predictive coding framework that involves reducing temporal redundancy by compensating for motion between frames of video. The basic concept is to remove the temporal dependencies between neighboring pictures by using a block matching method. At the outset of an encoding process, each frame of the unencoded video sequence is grouped into one of three categories: I-type frames, P-type frames, and B-type frames. I-type frames are intra-coded. That is, only information from the frame itself is used to encode the picture and no inter-frame motion compensation techniques are used (although intra-frame motion compensation techniques may be applied).

The other two types of frames, P-type and B-type, are encoded using inter-frame motion compensation techniques. The difference between P-picture and B-picture is the temporal direction of the reference pictures used for motion compensation. P-type pictures utilize information from previous pictures (in display order), whereas B-type pictures may utilize information from both previous and future pictures (in display order).

For P-type and B-type frames, each frame is then divided into blocks of pixels, represented by coefficients of each pixel's luma and chrominance components, and one or more motion vectors are obtained for each block (because B-type pictures may utilize information from both a future and a past coded frame, two motion vectors may be encoded for each block). A motion vector (MV) represents the spatial displacement from the position of the current block to the position of a similar block in another, previously encoded frame (which may be a past or future frame in display order), respectively referred to as a reference block and a reference frame. The difference, if any, between the reference block and the current block is determined and a residual (also referred to as a "residual signal") is obtained. Therefore, for each block of an inter-coded frame, only the residuals and motion vectors need to be encoded rather than the entire contents of the block. By removing this kind of temporal redundancy between frames of a video sequence, the video sequence can be compressed.

To further compress the video data, after inter or intra frame prediction techniques have been applied, the coefficients of the residual signal are often transformed from the spatial domain to the frequency domain (e.g., using a discrete cosine transform ("DCT") or a discrete sine transform ("DST")). For naturally occurring images, such as the type of images that typically make up human perceptible video sequences, low-frequency energy is always stronger than high-frequency energy. Residual signals in the frequency domain therefore get better energy compaction than they would in spatial domain. After forward transform, the coefficients and motion vectors may be quantized and entropy encoded before being packetized or otherwise processed, e.g., for transmission over a network such as the Internet.

On the decoder side, inversed quantization and inversed transforms are applied to recover the spatial residual signal. These are typical transform/quantization processes in many video compression standards. A reverse prediction process may then be performed in order to generate a recreated version of the original unencoded video sequence.

In past standards, the blocks used in coding were generally sixteen by sixteen pixels (referred to as macroblocks in many video coding standards). However, since the development of these standards, frame sizes have grown larger and many devices have gained the capability to display higher than "high definition" (or "HD") frame sizes, such as 2048×1530 pixels. Thus it may be desirable to have larger blocks to efficiently encode the motion vectors for these frame sizes, e.g., 64×64 pixels. It follows that it is also desirable to increase the size of the blocks of residual signals that are transformed from the spatial domain to the frequency domain.

DETAILED DESCRIPTION

Figure 1:
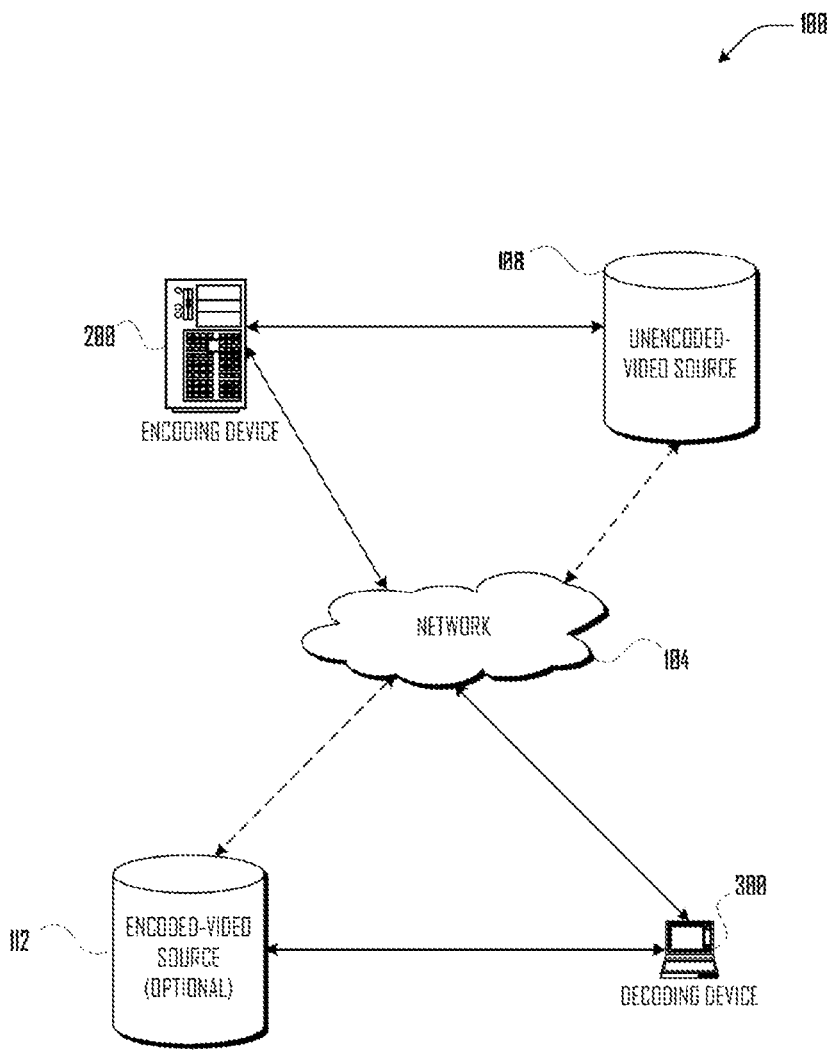
FIG. 1 illustrates an exemplary video encoding/decoding system according to one embodiment.

The detailed description that follows is represented largely in terms of processes and symbolic representations of operations by conventional computer components, including a processor, memory storage devices for the processor, connected display devices and input devices. Furthermore, these processes and operations may utilize conventional computer components in a heterogeneous distributed computing environment, including remote file servers, computer servers and memory storage devices. Each of these conventional distributed computing components is accessible by the processor via a communication network.

The phrases "in one embodiment," "in at least one embodiment," "in various embodiments," "in some embodiments," and the like may be used repeatedly herein. Such phrases do not necessarily refer to the same embodiment. The terms "comprising," "having," and "including" are synonymous, unless the context dictates otherwise. Various embodiments are described in the context of a typical "hybrid" video coding approach, as was described generally above, in that it uses inter-/intra-picture prediction and transform coding.

Reference is now made in detail to the description of the embodiments as illustrated in the drawings. While embodiments are described in connection with the drawings and related descriptions, it will be appreciated by those of ordinary skill in the art that alternate and/or equivalent implementations may be substituted for the specific embodiments shown and described, including all alternatives, modifications, and equivalents, whether or not explicitly illustrated and/or described, without departing from the scope of the present disclosure. In various alternate embodiments, additional devices, or combinations of illustrated devices, may be added to, or combined, without limiting the scope of the embodiments disclosed herein.

Exemplary Video Encoding/Decoding System

FIG. 1 illustrates an exemplary video encoding/decoding system 100 in accordance with at least one embodiment. Encoding device 200 (illustrated in FIG. 2 and described below) and decoding device 300 (illustrated in FIG. 3 and described below) are in data communication with a network 104. Decoding device 200 may be in data communication with unencoded video source 108, either through a direct data connection such as a storage area network ("SAN"), a high speed serial bus, and/or via other suitable communication technology, or via network 104 (as indicated by dashed lines in FIG. 1). Similarly, encoding device 300 may be in data communication with an optional encoded video source 112, either through a direct data connection, such as a storage area network ("SAN"), a high speed serial bus, and/or via other suitable communication technology, or via network 104 (as indicated by dashed lines in FIG. 1). In some embodiments, encoding device 200, decoding device 300, encoded-video source 112, and/or unencoded-video source 108 may comprise one or more replicated and/or distributed physical or logical devices. In many embodiments, there may be more encoding devices 200, decoding devices 300, unencoded-video sources 108, and/or encoded-video sources 112 than are illustrated.

In various embodiments, encoding device 200 may be a networked computing device generally capable of accepting requests over network 104, e.g., from decoding device 300, and providing responses accordingly. In various embodiments, decoding device 300 may be a networked computing device having a form factor such as a mobile-phone; watch, heads-up display, or other wearable computing device; a dedicated media player; a computing tablet; a motor vehicle head unit; an audio-video on demand (AVOD) system; a dedicated media console; a gaming device; a "set-top box;" a digital video recorder; a television; or a general purpose computer. In various embodiments, network 104 may include the Internet, one or more local area networks ("LANs"), one or more wide area networks ("WANs"), cellular data networks, and/or other data networks. Network 104 may, at various points, be a wired and/or wireless network.

Exemplary Encoding Device

Figure 2:
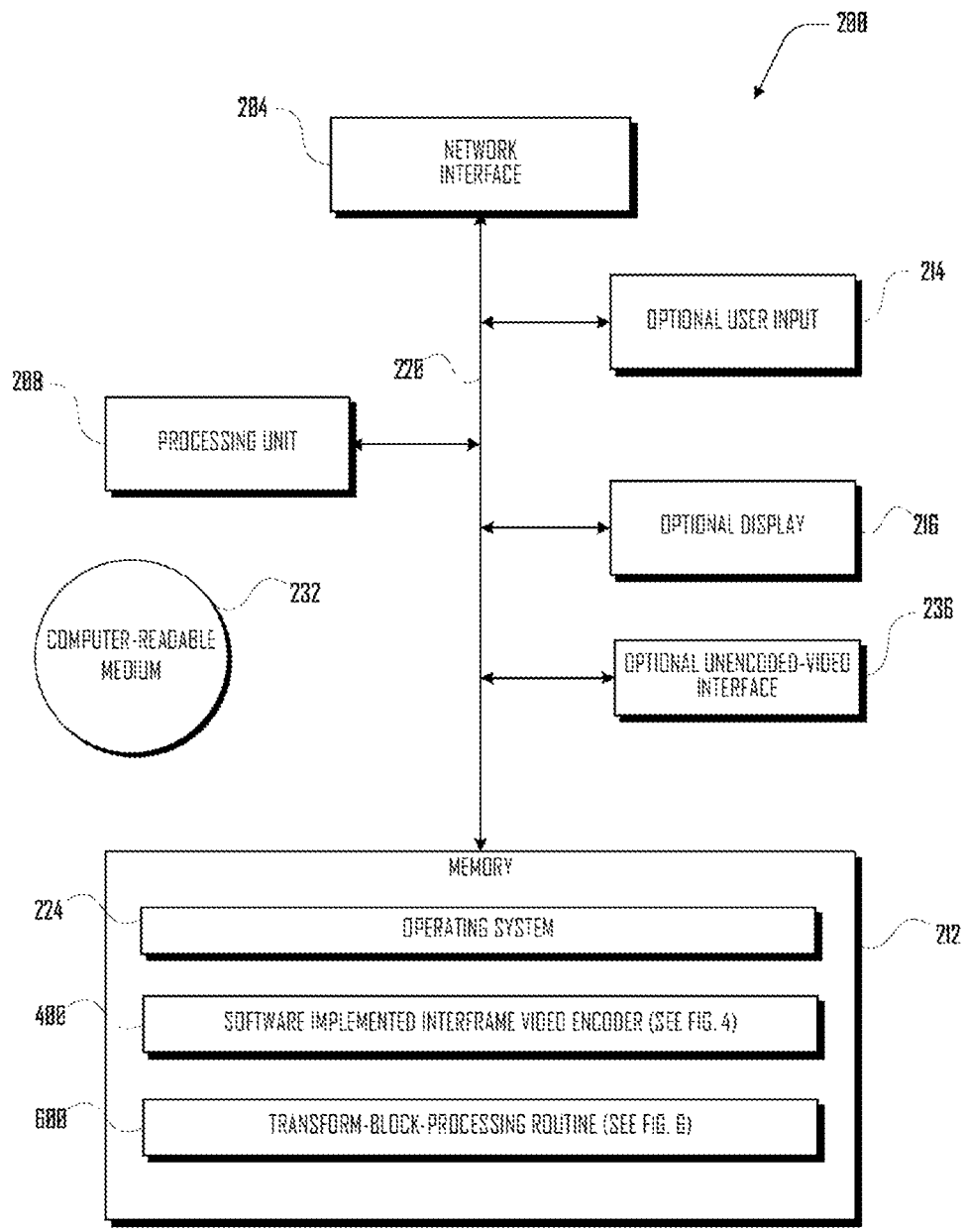
FIG. 2 illustrates several components of an exemplary encoding device, in accordance with one embodiment.

Referring to FIG. 2, several components of an exemplary encoding device 200 are illustrated. In some embodiments, an encoding device may include many more components than those shown in FIG. 2. However, it is not necessary that all of these generally conventional components be shown in order to disclose an illustrative embodiment. As shown in FIG. 2, exemplary encoding device 200 includes a network interface 204 for connecting to a network, such as network 104. Exemplary encoding device 200 also includes a processing unit 208, a memory 212, an optional user input 214 (e.g., an alphanumeric keyboard, keypad, a mouse or other pointing device, a touchscreen, and/or a microphone), and an optional display 216, all interconnected along with the network interface 204 via a bus 220. The memory 212 generally comprises a RAM, a ROM, and a permanent mass storage device, such as a disk drive, flash memory, or the like. 224 as well as program code for a number of software services, such as software implemented interframe video encoder 400 (described below in reference to FIG. 4) with instructions for performing a transform-block-processing routine 600 (described below in reference to FIG. 6). Memory 212 may also store video data files (not shown) which may represent unencoded copies of audio/visual media works, such as, by way of examples, movies and/or television episodes. These and other software components may be loaded into memory 212 of encoding device 200 using a drive mechanism (not shown) associated with a non-transitory computer-readable medium 232, such as a floppy disc, tape, DVD/CD-ROM drive, USB drive, memory card, or the like.

In operation, the operating system 224 manages the hardware and other software resources of the encoding device 200 and provides common services for software applications, such as software implemented interframe video encoder 400. For hardware functions such as network communications via network interface 204, receiving data via input 214, outputting data via optional display 216, and allocation of memory 212 for various software applications, such as software implemented interframe video encoder 400, operating system 224 acts as an intermediary between software executing on the encoding device and the hardware.

In some embodiments, encoding device 200 may further comprise a specialized unencoded video interface 236 for communicating with unencoded-video source 108, such as a high speed serial bus, or the like. In some embodiments, encoding device 200 may communicate with unencoded-video source 108 via network interface 204. In other embodiments, unencoded-video source 108 may reside in memory 212 or computer readable medium 232.

Although an exemplary encoding device 200 has been described that generally conforms to conventional general purpose computing devices, an encoding device 200 may be any of a great number of devices capable of executing instructions for encoding video in accordance with various embodiments, such as exemplary software implemented video encoder 400, and transform-block-processing routine 600, for example, a video recording device, a video co-processor and/or accelerator, a personal computer, a game console, a set-top box, a handheld or wearable computing device, a smart phone, or any other suitable device.

Encoding device 200 may, by way of example, be operated in furtherance of an on-demand media service (not shown). In at least one exemplary embodiment, the on-demand media service may be operating encoding device 200 in furtherance of an online on-demand media store providing digital copies of media works, such as video content, to users on a per-work and/or subscription basis. The on-demand media service may obtain digital copies of such media works from unencoded video source 108.

Exemplary Decoding Device

Figure 3:
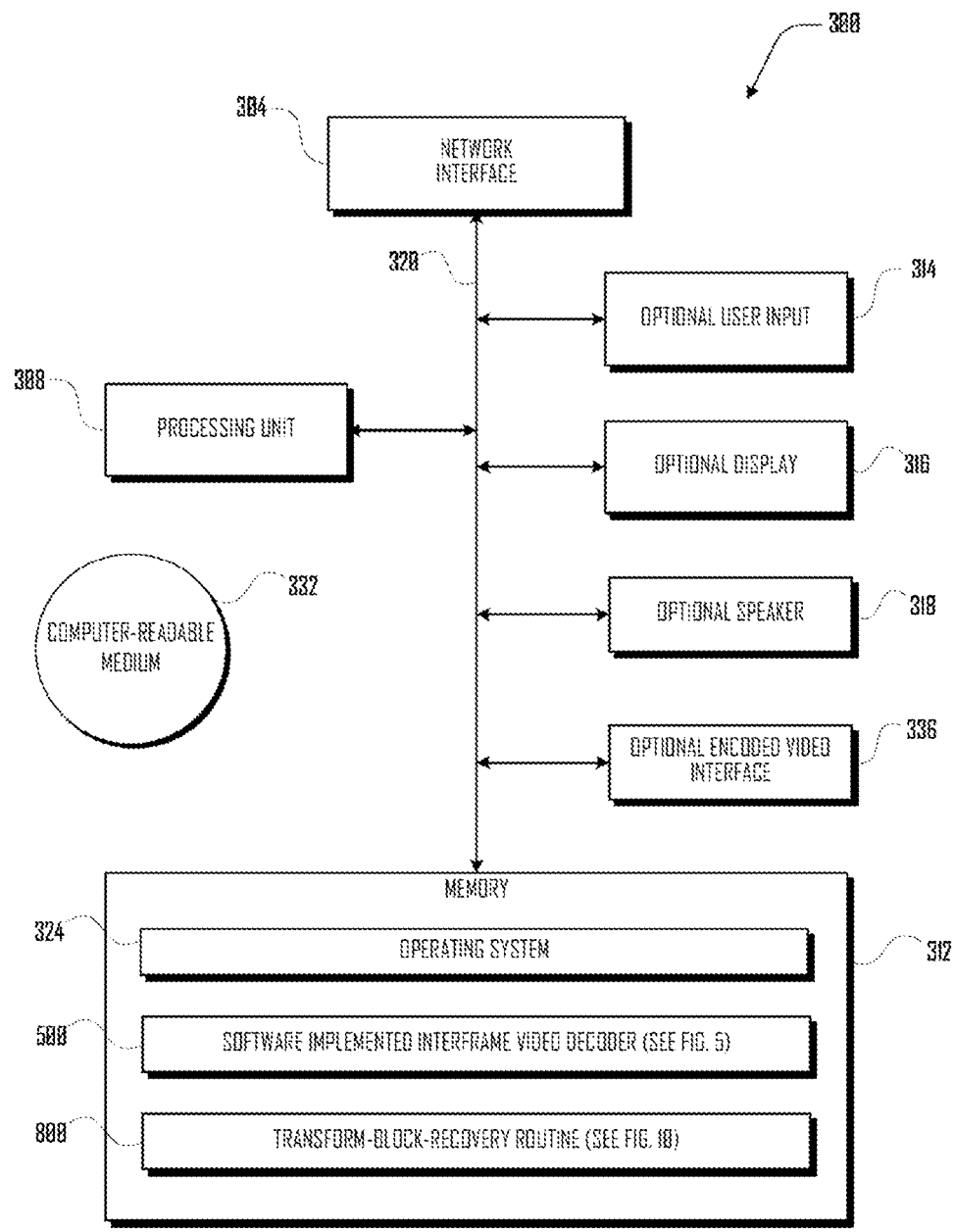
FIG. 3 illustrates several components of an exemplary decoding device, in accordance with one embodiment.

Referring to FIG. 3, several components of an exemplary decoding device 300 are illustrated. In some embodiments, a decoding device may include many more components than those shown in FIG. 3. However, it is not necessary that all of these generally conventional components be shown in order to disclose an illustrative embodiment. As shown in FIG. 3, exemplary decoding device 300 includes a network interface 304 for connecting to a network, such as network 104. Exemplary decoding device 300 also includes a processing unit 308, a memory 312, an optional user input 314 (e.g., an alphanumeric keyboard, keypad, a mouse or other pointing device, a touchscreen, and/or a microphone), an optional display 316, and an optional speaker 318, all interconnected along with the network interface 304 via a bus 320. The memory 312 generally comprises a RAM, a ROM, and a permanent mass storage device, such as a disk drive, flash memory, or the like.

The memory 312 of exemplary decoding device 300 may store an operating system 324 as well as program code for a number of software services, such as software implemented video decoder 500 (described below in reference to FIG. 5) with instructions for performing a transform-block-recovery routine 1000 (described below in reference to FIG. 10). Memory 312 may also store video data files (not shown) which may represent encoded copies of audio/visual media works, such as, by way of example, movies and/or television episodes. These and other software components may be loaded into memory 312 of decoding device 300 using a drive mechanism (not shown) associated with a non-transitory computer-readable medium 332, such as a floppy disc, tape, DVD/CD-ROM drive, memory card, or the like.

In operation, the operating system 324 manages the hardware and other software resources of the decoding device 300 and provides common services for software applications, such as software implemented video decoder 500. For hardware functions such as network communications via network interface 304, receiving data via input 314, outputting data via optional display 316 and/or optional speaker 318, and allocation of memory 312, operating system 324 acts as an intermediary between software executing on the encoding device and the hardware.

In some embodiments, decoding device 300 may further comprise an optional encoded video interface 336, e.g., for communicating with encoded-video source 116, such as a high speed serial bus, or the like. In some embodiments, decoding device 300 may communicate with an encoded-video source, such as encoded video source 116, via network interface 304. In other embodiments, encoded-video source 116 may reside in memory 312 or computer readable medium 332.

Although an exemplary decoding device 300 has been described that generally conforms to conventional general purpose computing devices, a decoding device 300 may be any of a great number of devices capable of executing instructions for decoding video in accordance with various embodiments, such as exemplary software implemented video decoder 500, and transform-block-recovery routine 1000, for example, a video recording device, a video co-processor and/or accelerator, a personal computer, a game console, a set-top box, a handheld or wearable computing device, a smart phone, or any other suitable device.

Decoding device 300 may, by way of example, be operated in cooperation with the on-demand media service. In at least one exemplary embodiment, the on-demand media service may provide digital copies of media works, such as video content, to a user operating decoding device 300 on a per-work and/or subscription basis. The decoding device may obtain digital copies of such media works from unencoded video source 108 via, for example, encoding device 200 via network 104.

Software Implemented Interframe Video Encoder

Figure 4:
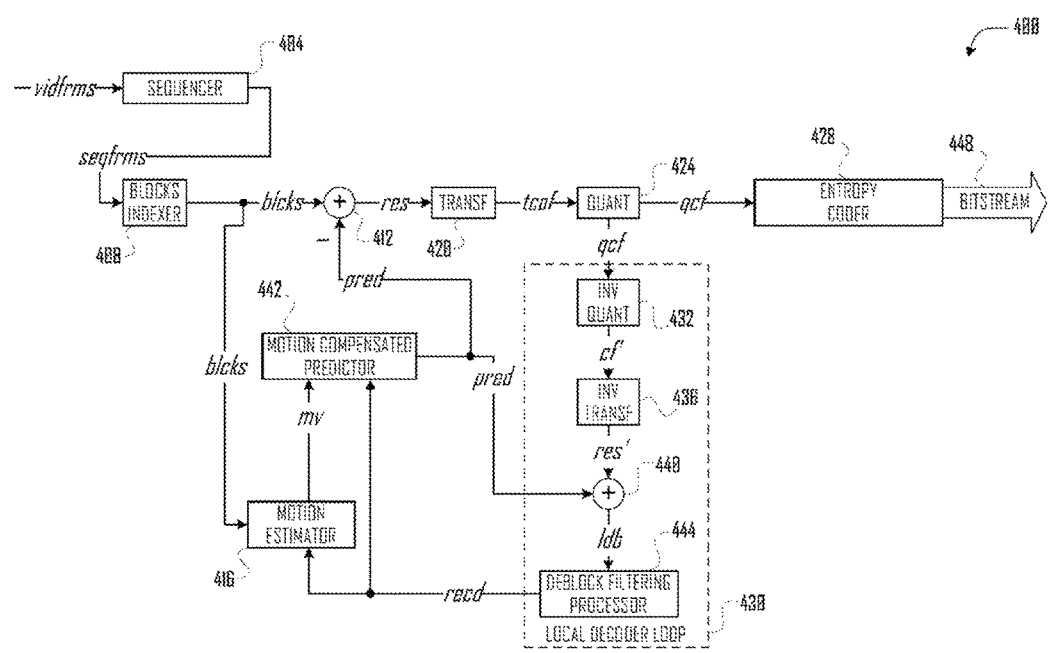
FIG. 4 illustrates a block diagram of an exemplary video encoder in accordance with at least one embodiment.

FIG. 4 shows a general functional block diagram of software implemented interframe video encoder 400 (hereafter "encoder 400") employing residual transformation techniques in accordance with at least one embodiment. One or more unencoded video frames (vidfrms) of a video sequence in display order may be provided to sequencer 404.

Sequencer 404 may assign a predictive-coding picture-type (e.g., I, P, or B) to each unencoded video frame and reorder the sequence of frames, or groups of frames from the sequence of frames, into a coding order for motion prediction purposes (e.g., I-type frames followed by P-type frames, followed by B-type frames). The sequenced unencoded video frames (seqfrms) may then be input in coding order to blocks indexer 408.

For each of the sequenced unencoded video frames (seqfrms), blocks indexer 408 may determine a largest coding block ("LCB") size for the current frame (e.g., sixty-four by sixty-four pixels) and divide the unencoded frame into an array of coding blocks (blks). Individual coding blocks within a given frame may vary in size, e.g., from four by four pixels up to the LCB size for the current frame.

Each coding block may then be input one at a time to differencer 412 and may be differenced with corresponding prediction signal blocks (pred) generated from previously encoded coding blocks. To generate the prediction blocks (pred), coding blocks (cblks) are also provided to motion estimator 416. After differencing at differencer 412, a resulting residual block (res) may be forward-transformed to a frequency-domain representation by transformer 420 (discussed below), resulting in a block of transform coefficients (tcof). The block of transform coefficients (tcof) may then be sent to the quantizer 424 resulting in a block of quantized coefficients (qcf) that may then be sent both to an entropy coder 428 and to a local decoding loop 430.

At the beginning of local decoding loop 430, inverse quantizer 432 may de-quantize the quantized coefficients (qcf) and pass the resulting de-quantized coefficients (cf') to inverse transformer 436 to generate a de-quantized residual block (res). At adder 440, a prediction block (pred) from motion compensated predictor 442 may be added to the de-quantized residual block (res') to generate a locally decoded block (ldb). Locally decoded block (ldb) may then be sent to a frame assembler and deblock filter processor 444, which reduces blockiness and assembles a recovered frame (recd), which may be used as the reference frame for motion estimator 416 and motion compensated predictor 442.

Entropy coder 428 encodes the quantized transform coefficients (qcf), differential motion vectors (dmv), and other data, generating an encoded video bit-stream 448. For each frame of the unencoded video sequence, encoded video bit-stream 448 may include encoded picture data (e.g., the encoded quantized transform coefficients (qcf) and differential motion vectors (dmv)) and an encoded frame header (e.g., syntax information such as the LCB size for the current frame).

Forward Integer Transform Procedures

Referring to the functionality of transformer 420, the transformer receives a block of residual values for each coding block's luma and chroma values and divides the block of residual values into one or more luma and chroma transform blocks.

In at least one embodiment, a coding block is divided into transform blocks sized according to the current coding block size as well as the size of the prediction block(s) used for motion estimation for the coding block. For example, transform block size may be assigned according to the combinations shown in Table 1, below. Transformer 420 may also set a maximum-transform-block-size flag in the picture header for the current frame.

TABLE 1

| CB size | PB size | Luma TB size | Chroma TB size |
|---|---|---|---|
| 8 × 8 | 8 × 8 | 8 × 8 | 4 × 4 |
|  | other | 4 × 4 | 4 × 4 |
| 16 × 16 | 16 × 16 | 16 × 16 | 8 × 8 |
|  | other | 4 × 4 | 4 × 4 |
| >=32 × 32 | 32 × 32 | 16 × 16 | 8 × 8 |
|  | other | 16 × 16 | 8 × 8 |

After a coding block is divided into transform blocks, the residual values in the transform blocks are converted from the spatial domain to the frequency domain, for example via a forward DCT transform operation. In at least one embodiment, in order to increase coding efficiency, integer equivalents of the transform block's residual values are obtained and a forward integer DCT transform operation may be performed. In order to further increase coding efficiency, it may be advantageous to utilize a single-instruction-multiple-data (SIMD) instruction architecture in the video coding process. However, most common implementations of SIMD instruction architecture require a bit-width of sixteen bits. Therefore, in at least one embodiment, bit-shifting operations may be performed on the residual values after some forward transformation operations (and, on the decoder side, on the transform coefficients after some inverse transformation operations) to ensure the residual values and transform coefficients may be represented by sixteen bit integers.

In at least one embodiment, for a 4×4 transform block, transformer 420 may perform a forward integer DCT transform operation according to the following equation:

$$\vec{y} = T_{4 \times 4} \vec{x}$$

Where: $\vec{x}$ is the input residual-value vector for the current transform block, $\vec{y}$ is the output vector for the transform operation, and $T_{4 \times 4}$ is a 4×4 forward integer transform matrix, given by:

$$T_{4 \times 4} = \begin{bmatrix} 13 & 13 & 13 & 13 \\ 17 & 7 & -7 & -17 \\ 13 & -13 & -13 & 13 \\ 7 & -17 & 17 & -7 \end{bmatrix}$$

In at least one embodiment, in the case of a 8×8 transform block, transformer 420 may perform a forward integer DCT transform operation according to the following equation:

$$\vec{y} = T_{8 \times 8} \vec{x}$$

Where: $\vec{x}$ is the input residual-value vector for the current transform block, $\vec{y}$ is the output vector for the transform operation, and $T_{8 \times 8}$ is an 8×8 forward integer transform matrix, given by:

$$T_{8 \times 8} = \begin{bmatrix} 37 & 37 & 37 & 37 & 37 & 37 & 37 & 37 \\ 51 & 43 & 29 & 10 & -10 & -29 & -43 & -51 \\ 48 & 20 & -20 & -48 & -48 & -20 & 20 & 48 \\ 43 & -10 & -51 & -29 & 29 & 51 & 10 & -43 \\ 37 & -37 & -37 & 37 & 37 & -37 & -37 & 37 \\ 29 & -51 & 10 & 43 & -43 & -10 & 51 & -29 \\ 20 & -48 & 48 & -20 & -20 & 48 & -48 & 20 \\ 10 & -29 & 43 & -51 & 51 & -43 & 29 & -10 \end{bmatrix}$$

After the 8×8 forward integer DCT transform operation, in order to guarantee sixteen-bit operation, transformer 420 may bit-shift the value of the transform coefficients two bits to the right.

In at least one embodiment, in the case of an 16×16 transform block, transformer 420 may perform a forward integer DCT transform operation according to the following equation:

$$\vec{y} = T_{16 \times 16} \vec{x}$$

Where: $\vec{x}$ is the input residual-value vector for the current transform block, $\vec{y}$ is the output vector for the transform operation, and $T_{16 \times 16}$ is a 16×16 forward integer transform matrix, given by:

$$T_{16 \times 16} = \begin{bmatrix} t_0 \\ t_1 \\ t_2 \\ \vdots \\ t_{14} \\ t_{15} \end{bmatrix}$$

Where $t_0, t_1, t_2 \ldots t_{14}, t_{15}$ are defined in Table 2, below.

After the 16×16 forward integer DCT transform operation, in order to guarantee sixteen-bit operation, transformer 420 may bit-shift the value of the transform coefficients two bits to the right.

TABLE 2

| | | | | | | | | | | | | | | | | |
|---|---|---|---|---|---|---|---|---|---|---|---|---|---|---|---|---|
| $t_0=$ | {26 | 26 | 26 | 26 | 26 | 26 | 26 | 26 | 26 | 26 | 26 | 26 | 26 | 26 | 26 | 26} |
| $t_1=$ | {37 | 35 | 32 | 28 | 23 | 17 | 11 | 4 | −4 | −11 | −17 | −23 | −28 | −32 | −35 | −37} |
| $t_2=$ | {36 | 31 | 20 | 7 | −7 | −20 | −31 | −36 | −36 | −31 | −20 | −7 | 7 | 20 | 31 | 36} |
| $t_3=$ | {35 | 23 | 4 | −17 | −32 | −37 | −28 | −11 | 11 | 28 | 37 | 32 | 17 | −4 | −23 | −35} |
| $t_4=$ | {34 | 14 | −14 | −34 | −34 | −14 | 14 | 34 | 34 | 14 | −14 | −34 | −34 | −14 | 14 | 34} |
| $t_5=$ | {32 | 4 | −28 | −35 | −11 | 23 | 37 | 17 | −17 | −37 | −23 | 11 | 35 | 28 | −4 | −32} |
| $t_6=$ | {31 | −7 | −36 | −20 | 20 | 36 | 7 | −31 | −31 | 7 | 36 | 20 | −20 | −36 | −7 | 31} |
| $t_7=$ | {28 | −17 | −35 | 4 | 37 | 11 | −32 | −23 | 23 | 32 | −11 | −37 | −4 | 35 | 17 | −28} |
| $t_8=$ | {26 | −26 | −26 | 26 | 26 | −26 | −26 | 26 | 26 | −26 | −26 | 26 | 26 | −26 | −26 | 26} |
| $t_9=$ | {23 | −32 | −11 | 37 | −4 | −35 | 17 | 28 | −28 | −17 | 35 | 4 | −37 | 11 | 32 | −23} |
| $t_{10}=$ | {20 | −36 | 7 | 31 | −31 | −7 | 36 | −20 | −20 | 36 | −7 | −31 | 31 | 7 | −36 | 20} |
| $t_{11}=$ | {17 | −37 | 23 | 11 | −35 | 28 | 4 | −32 | 32 | −4 | −28 | 35 | −11 | −23 | 37 | −17} |
| $t_{12}=$ | {14 | −34 | 34 | −14 | −14 | 34 | −34 | 14 | 14 | −34 | 34 | −14 | −14 | 34 | −34 | 14} |
| $t_{13}=$ | {11 | −28 | 37 | −32 | 17 | 4 | −23 | 35 | −35 | 23 | −4 | −17 | 32 | −37 | 28 | −11} |
| $t_{14}=$ | {7 | −20 | 31 | −36 | 36 | −31 | 20 | −7 | −7 | 20 | −31 | 36 | −36 | 31 | −20 | 7} |
| $t_{15}=$ | {4 | −11 | 17 | −23 | 28 | −32 | 35 | −37 | 37 | −35 | 32 | −28 | 23 | −17 | 11 | −4} |

Depending on the number of transform blocks per coding block, it may be possible to further increase coding efficiency by performing an additional transform operation on the DC coefficient of each transform block. The DC coefficients are collected into a DC integer transform block and transformed again, for example in accordance with one of the forward integer DCT transform operations described above. This process is called a double transform.

Software Implemented Interframe Decoder

Figure 5:
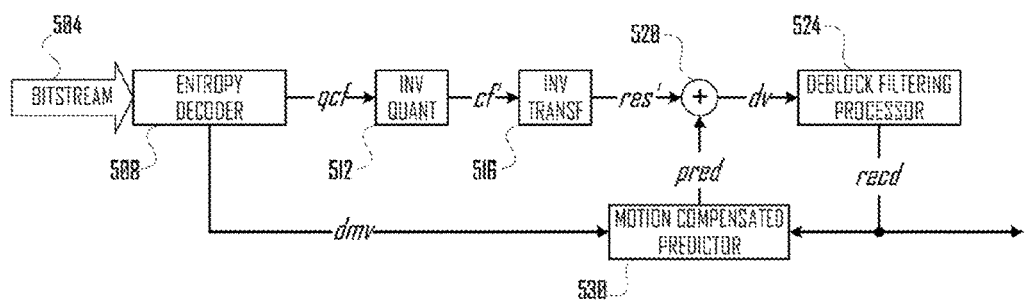
FIG. 5 illustrates a block diagram of an exemplary video decoder in accordance with at least one embodiment.

FIG. 5 shows a general functional block diagram of a corresponding software implemented interframe video decoder 500 (hereafter "decoder 500") inverse residual transformation techniques in accordance with at least one embodiment and being suitable for use with a decoding device, such as decoding device 300. Decoder 500 may work similarly to the local decoding loop 455 at encoder 400.

Specifically, an encoded video bit-stream 504 to be decoded may be provided to an entropy decoder 508, which may decode blocks of quantized coefficients (qcf), differential motion vectors (dmv), accompanying message data packets (msg-data), and other data. The quantized coefficient blocks (qcf) may then be inverse quantized by an inverse quantizer 512, resulting in de-quantized coefficients (cf'). De-quantized coefficients (cf') may then be inverse transformed out of the frequency-domain by an inverse transformer 516 (described below), resulting in decoded residual blocks (res'). An adder 520 may add the decoded residual blocks (res') with motion compensated prediction blocks (pred) obtained from motion compensated predictor 530 by using corresponding motion vectors (mv). The resulting decoded video (dv) may be deblock-filtered in a frame assembler and deblock filtering processor 524. Blocks (recd) at the output of frame assembler and deblock filtering processor 528 form a reconstructed frame of the video sequence, which may be output from the decoder 500 and also may be used as the reference frame for a motion compensated predictor 530 for decoding subsequent coding blocks.

Inverse Integer Transform Procedures

Referring to the functionality of inverse transformer 516, the inverse transformer obtains blocks of de-quantized sixteen-bit integer transform coefficients from inverse quantizer 512. The inverse transformer 516 performs an inverse integer DCT transform operation on the transform coefficients obtained from inverse quantizer 512 in order to reverse the forward integer DCT transform operation performed by transformer 420, described above, and recover the residual values.

If the transform coefficients of the current coding block have been double transformed, inverse transformer performs an inverse double transform procedure, as is described below. After the DC transform coefficients have been inverse transformed and inserted back into their corresponding transform blocks, inverse transformer proceeds to perform an inverse integer DCT transformation operation.

For example, in at least one embodiment, for a block of sixteen-bit integer transform coefficients corresponding to a 4×4 transform block, inverse transformer 516 may perform an inverse integer DCT transform operation according to the following equation:

$$\vec{y'} = T_{4 \times 4}^{-1} \vec{x_q}$$

Where: $\vec{x_q}$ is the quantized transform coefficient vector, $\vec{y'}$ is the recovered residual-value vector, and $T_{4 \times 4}^{-1}$ is a 4×4 inverse integer transform matrix, given by:

$$T_{4 \times 4}^{-1} = \begin{bmatrix} 13 & 17 & 13 & 7 \\ 13 & 7 & -13 & -17 \\ 13 & -7 & -13 & 17 \\ 13 & -17 & 13 & -7 \end{bmatrix}$$

After the 4×4 inverse integer DCT transform operation, in order to guarantee sixteen-bit operation, inverse transformer may bit-shift the value of the resulting residual values five bits to the right.

In at least one embodiment, for a block of sixteen-bit integer transform coefficients corresponding to an 8×8 transform block, inverse transformer 516 may perform an inverse integer DCT transform operation according to the following equation:

$$\vec{y'} = T_{8 \times 8}^{-1} \vec{x_q}$$

Where: $\vec{x_q}$ is the quantized transform coefficient vector, $\vec{y'}$ is the recovered residual-value vector, and $T_{8\times8}^{-1}$ is an 8×8 inverse integer transform matrix, for example the inverse of the 8×8 forward integer transform matrix, $T_{8\times8}$, described above.

After the 8×8 inverse integer DCT transform operation, in order to guarantee sixteen-bit operation, inverse transformer may bit-shift the value of the resulting residual values seven bits to the right.

In at least one embodiment, for a block of sixteen-bit integer transform coefficients corresponding to a 16×16 transform block, inverse transformer 516 may perform an inverse integer DCT transform operation according to the following equation:

$$\vec{y'} = T_{16\times16}^{-1} \vec{x_q}$$

Where: $\vec{x_q}$ is the quantized transform coefficient vector, $\vec{y'}$ is the recovered residual value vector and $T_{16\times16}^{-1}$ is a 16×16 inverse integer transform matrix, for example the inverse of the 16×16 forward integer transform matrix, $T_{16\times16}$, described above.

After the 16×16 inverse integer DCT transform operation, in order to guarantee sixteen-bit operation, inverse transformer may bit-shift the value of the resulting residual values seven bits to the right.

Transform-Block-Processing-Routine

Figure 6:
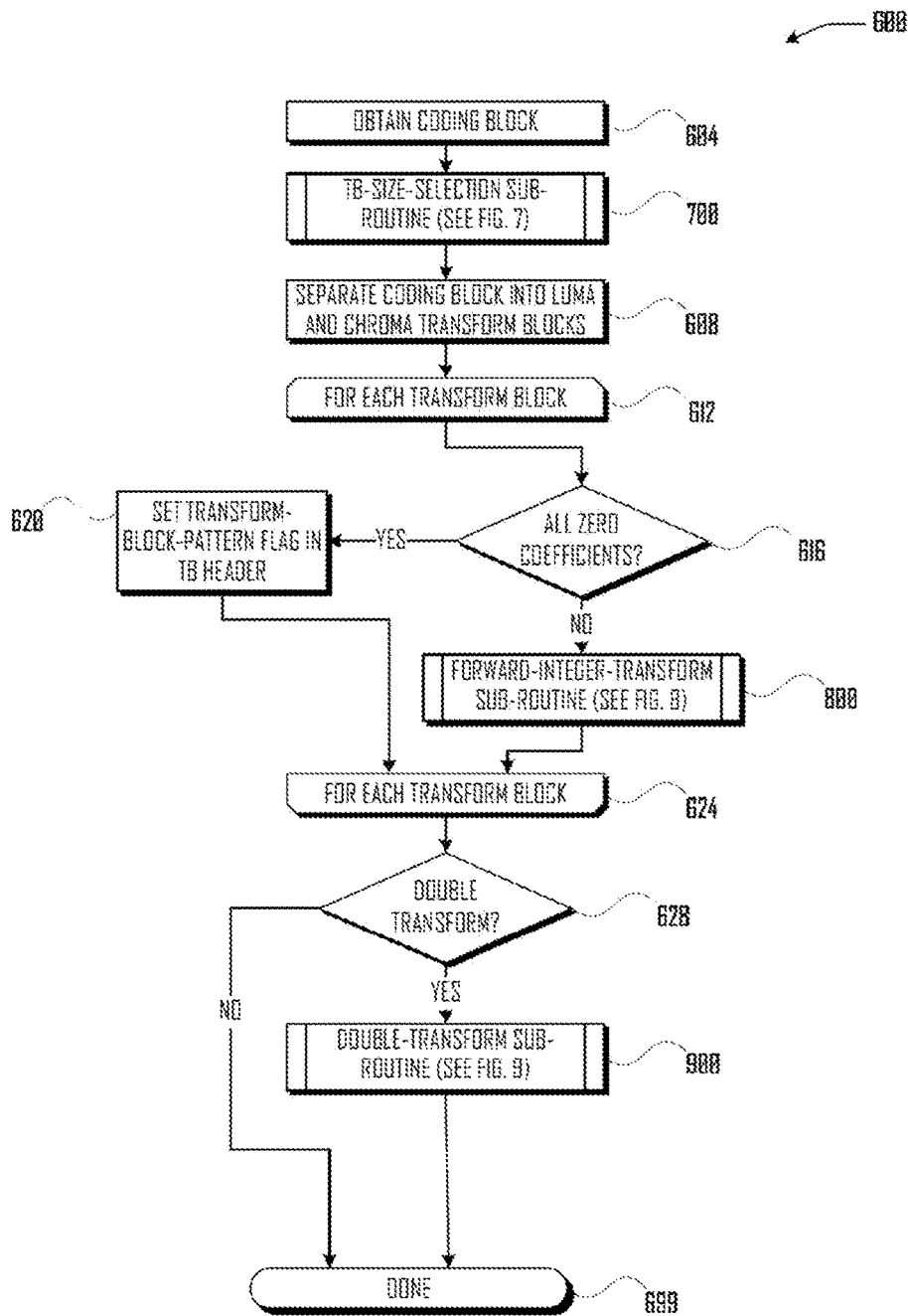
FIG. 6 illustrates a transform-block-processing routine in accordance with at least one embodiment.

FIG. 6 illustrates a transform-block-processing routine 600 suitable for use with at least one embodiment, such as encoder 400. As will be recognized by those having ordinary skill in the art, not all events in the encoding process are illustrated in FIG. 6. Rather, for clarity, only those steps reasonably relevant to describing the illustrated embodiment are shown.

At execution block 604, transform-block-processing routine 600 obtains a coding block of integer residual values for a current frame being encoded. Transform-block-processing routine 600 then provides the size of the current coding block and the size of the corresponding prediction blocks used in motion estimation to transform-block-size-selection sub-routine 700 (described below in reference to FIG. 7), which returns appropriate chroma and luma transform block sizes for the current combination of current coding block size and prediction block size.

At execution block 608, transform-block-processing routine 600 then separates the current coding block into one or more transform blocks of sixteen-bit integer residual values according to the chroma and luma transform block sizes returned by transform-block-size-selection sub-routine 700, above.

At starting loop block 612, each transform block of the current coding block is processed in turn.

At decision block 616, if each of the residual values of the current transform block has a zero value, then at execution block 620, transform-block-processing routine 600 sets a corresponding transform-block-pattern flag in the transform block header of the current transform block.

Otherwise, at decision block 616, if one or more of the residual values of the current transform block has a non-zero value, then transform-block-processing routine 600 calls forward-integer-transform sub-routine 800 (described below in reference to FIG. 8), which returns a corresponding block of sixteen-bit integer transform coefficients.

At ending loop block 624, transform-block-processing routine 600 iterates back to starting loop block 612 to process the next transform block of the current coding block (if any).

At decision block 628, if the transform blocks of the current coding block can be double transformed, e.g., there are sixteen or sixty four transform blocks in the current coding block, then transform-block-processing routine 600 may call double-transform sub-routine 900 (described below in reference to FIG. 9) which performs an additional transform operation on the DC integer-transform coefficients of the transform blocks of the current coding block and returns a corresponding double-transformed block of sixteen-bit integer-transform coefficients.

After double-transform sub-routine 900 returns the double-transformed block of sixteen-bit integer-transform coefficients, or, referring again to decision block 628, if the current coding block is not amenable to a double transform, then transform-block-processing routine 600 ends for the current coding block at termination block 699.

Transform-Block-Size-Selection Sub-Routine

Figure 7:
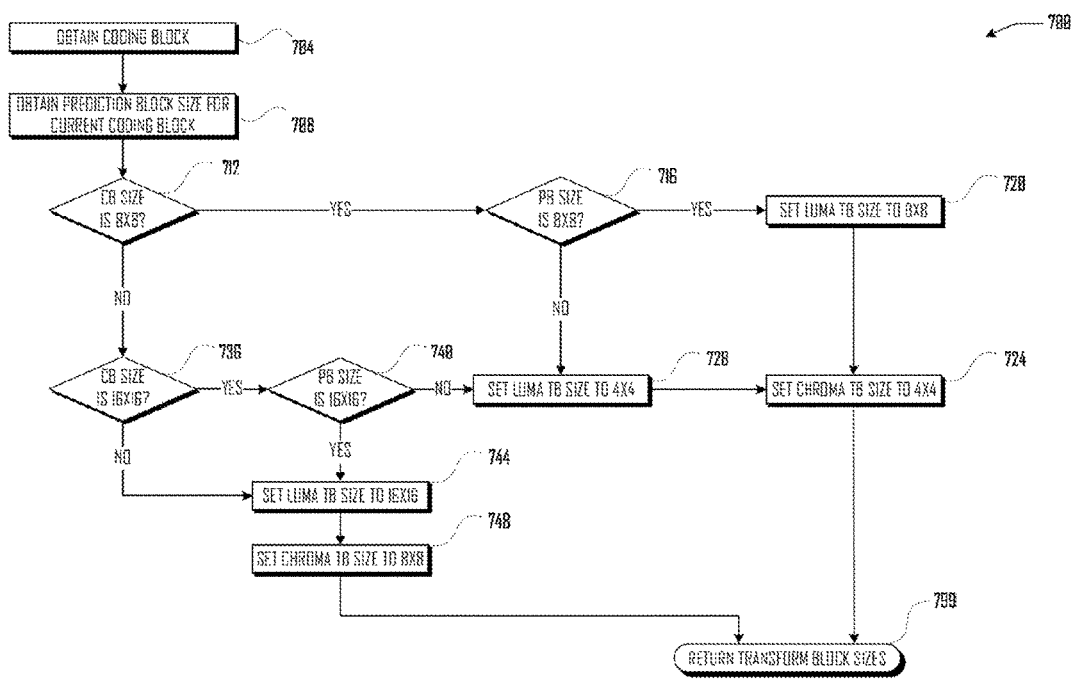
FIG. 7 illustrates a transform-block-size-selection sub-routine in accordance with at least one embodiment.

FIG. 7 illustrates a transform-block-size-selection sub-routine 700 suitable for use with at least one embodiment, such as transform-block-processing routine 600.

At execution block 704, transform-block-size-determination sub-routine 700 obtains the coding block size and the prediction block size used for the motion estimation process of the current coding block.

At decision block 712, if the coding block size of the current coding block is 8×8 pixels, then transform-block-size-determination sub-routine 700 proceeds to decision block 716.

At decision block 716, if the prediction block size for the current coding block is 8×8 pixels, then at execution block 720, transform-block-size-determination sub-routine 700 sets the luma transform block size for the current coding block to 8×8 luma transform coefficients and, at execution block 724, transform-block-size-determination sub-routine sets the chroma transform block size for the current coding block to 4×4 chroma transform coefficients. Transform-block-size-determination sub-routine then returns the luma transform block size and the chroma transform block size for the current coding block at return block 799.

Referring again to decision block 716, if the prediction block size for the current coding block is not 8×8 pixels, then at execution block 728, transform-block-size-determination sub-routine 700 sets the luma transform block size for the current coding block to 4×4 luma transform coefficients. Transform-block-size-determination sub-routine 700 then proceeds to execution block 724. As described above, at execution block 724, transform-block-size-determination sub-routine sets the chroma transform block size for the current coding block to 4×4 chroma transform coefficients. Transform-block-size-determination sub-routine then returns the luma transform block size and the chroma transform block size for the current coding block at return block 799.

Referring again to decision block 712, if the coding block size for the current coding block is not 8×8 pixels, transform-block-size-determination sub-routine 700 proceeds to decision block 736.

At decision block 736, if the coding block size for the current coding block is 16×16 pixels, then transform-block-size-determination sub-routine 700 proceeds to decision block 740.

At decision block 740, if the prediction block size for the current coding block is 16×16 pixels, then at execution block 744, transform-block-size-determination sub-routine 700 sets the luma transform block size for the current coding block to 16×16 luma transform coefficients, and, at execution block 748, transform-block-size-determination sub-routine then sets the chroma transform block size for the current coding block to 8×8 chroma transform coefficients. Transform-block-size-determination sub-routine then returns the luma transform block size and the chroma transform block size for the current coding block at return block 799.

Referring again to decision block 740, if the prediction block size for the current coding block is not 16×16 pixels, then transform-block-size-determination sub-routine 700 proceeds to execution block 728. As described above, at execution block 728, transform-block-size-determination sub-routine 700 sets the luma transform block size for the current coding block to 4×4 luma transform coefficients. Transform-block-size-determination sub-routine 700 then proceeds to execution block 724. As described above, at execution block 724, transform-block-size-determination sub-routine sets the chroma transform block size for the current coding block to 4×4 chroma transform coefficients. Transform-block-size-determination sub-routine then returns the luma transform block size and the chroma transform block size for the current coding block at return block 799.

Referring again to decision block 736, if the coding block size for the current coding block is not 16×16 pixels, then transform-block-size-determination sub-routine 700 proceeds to execution block 744. As described above, at execution block 744, transform-block-size-determination sub-routine 700 sets the luma transform block size for the current coding block to 16×16 luma transform coefficients, and, at execution block 748, transform-block-size-determination sub-routine then sets the chroma transform block size for the current coding block to 8×8 chroma transform coefficients. Transform-block-size-determination sub-routine then returns the luma transform block size and the chroma transform block size for the current coding block at return block 799.

Forward-Integer-Transform Sub-Routine

Figure 8:
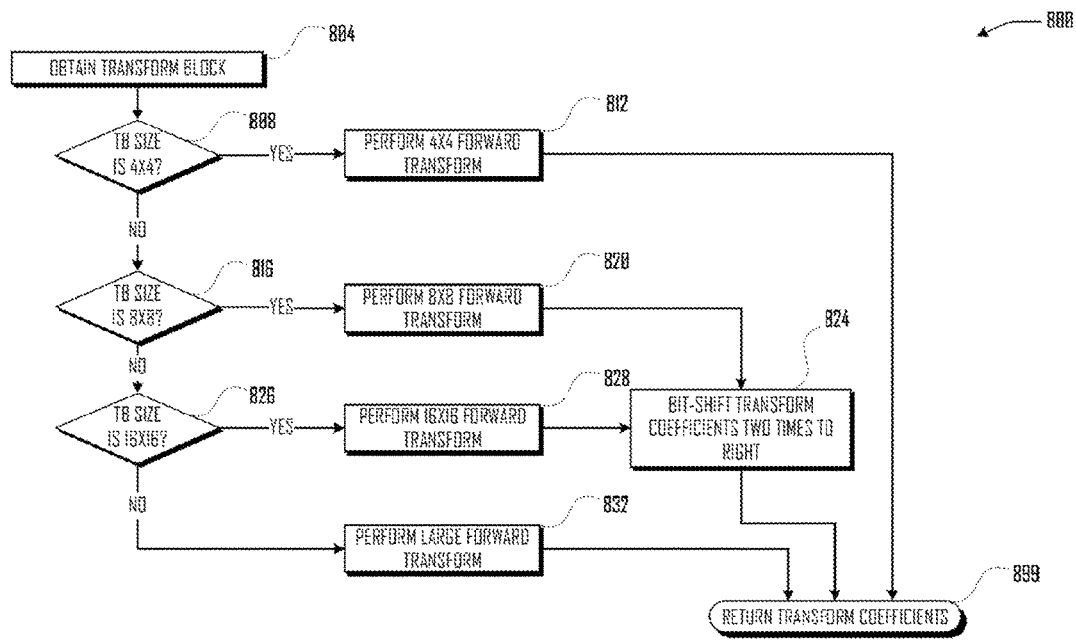
FIG. 8 illustrates a forward-integer-transform sub-routine in accordance with at least one embodiment.

FIG. 8 illustrates a forward-integer-transform sub-routine 800 suitable for use with at least one embodiment, such as transform-block-processing routine 600 or double-transform sub-routine 900, described below in reference to FIG. 9.

At execution block 804, forward-integer-transform sub-routine obtains a transform block, for example from transform-block-processing routine 600.

At decision block 808, if the current transform block is a 4×4 block of integer transform coefficients, then at execution block 812, forward-integer-transform sub-routine 800 performs a 4×4 forward transform, for example the 4×4 forward integer transform operation described above. Forward-integer-transform sub-routine 800 then returns the transform coefficients obtained via the 4×4 integer transform at return block 899.

Referring again to decision block 808, if the current transform block is not a 4×4 block of integer transform coefficients, for example an 8×8, a 16×16, a 32×32, or a 64×64 block of integer transform coefficients, then forward-integer-transform sub-routine 800 proceeds to decision block 816.

At decision block 816, if the current transform block is an 8×8 block of integer transform coefficients, then at execution block 820, forward-integer-transform sub-routine 800 performs an 8×8 forward transform, for example the 8×8 forward integer transform operation described above. At execution block 824, forward-integer-transform sub-routine 800 manipulates the transform coefficients obtained via the 8×8 integer transform at execution block 820, bit-shifting the transform coefficients twice to the right in order to ensure the transform coefficients may be represented by no more than sixteen bits. Forward-integer-transform sub-routine 800 returns the bit-shifted transform coefficients at return block 899.

Referring again to decision block 816, if the current transform block is not an 8×8 block of integer transform coefficients (for example, if it is a 16×16, a 32×32 or 64×64 block of integer transform coefficients), then forward-integer-transform sub-routine 800 proceeds to decision block 826.

At decision block 826, if the current transform block is a 16×16 block of integer transform coefficients, then at execution block 828, forward-integer-transform sub-routine 800 performs a 16×16 forward transform, for example the 16×16 forward integer transform operation described above. Forward-integer-transform sub-routine 800 then proceeds to execution block 824. As described above, at execution block 824, forward-integer-transform sub-routine 800 manipulates the transform coefficients obtained via the 8×8 integer transform at execution block 820, bit-shifting the transform coefficients twice to the right in order to ensure the transform coefficients may be represented by no more than sixteen bits. Forward-integer-transform sub-routine 800 returns the bit-shifted transform coefficients at return block 899.

Referring again to decision block 826, if the current transform block is larger than a 16×16 block of integer transform coefficients, for example a 32×32 or 64×64 block of integer transform coefficients, then at execution block 832, forward-integer-transform sub-routine 800 performs a large-transform procedure. Forward-integer-transform sub-routine 800 returns the results of the large integer transform procedure at return block 899.

Double-Transform Sub-Routine

Figure 9:
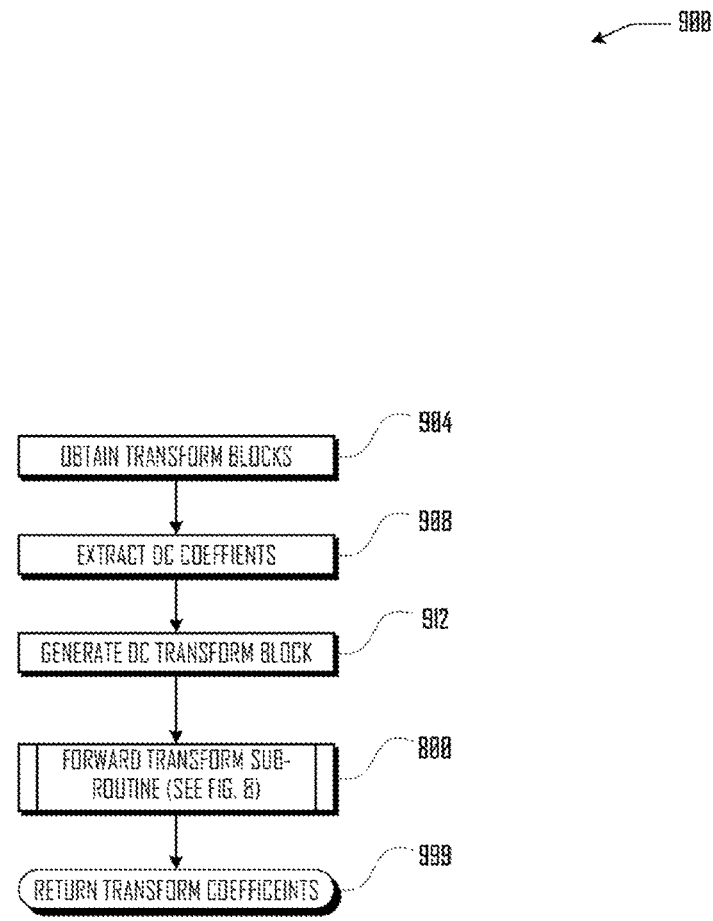
FIG. 9 illustrates a double-transform sub-routine in accordance with at least one embodiment.

FIG. 9 illustrates a double-transform sub-routine 900 suitable for use with at least one embodiment, such as transform-block-processing routine 600.

At execution block 904, double-transform sub-routine 900 obtains transform blocks of intermediate integer transform coefficients for the current coding block.

At execution block 908, double-transform sub-routine 900 extracts the intermediate DC coefficient from each block of intermediate integer transform coefficients.

At execution block 912, double-transform sub-routine 900 generates a transform block of the intermediate DC coefficients.

Double-transform sub-routine 900 then passes the intermediate DC coefficients to forward-transform sub-routine 800, which returns a (now double-transformed) block of sixteen-bit integer-transform coefficients.

Double-transform sub-routine 900 returns the double-transformed transform block at return block 999.

Transform-Block-Recovery Routine

Figure 10:
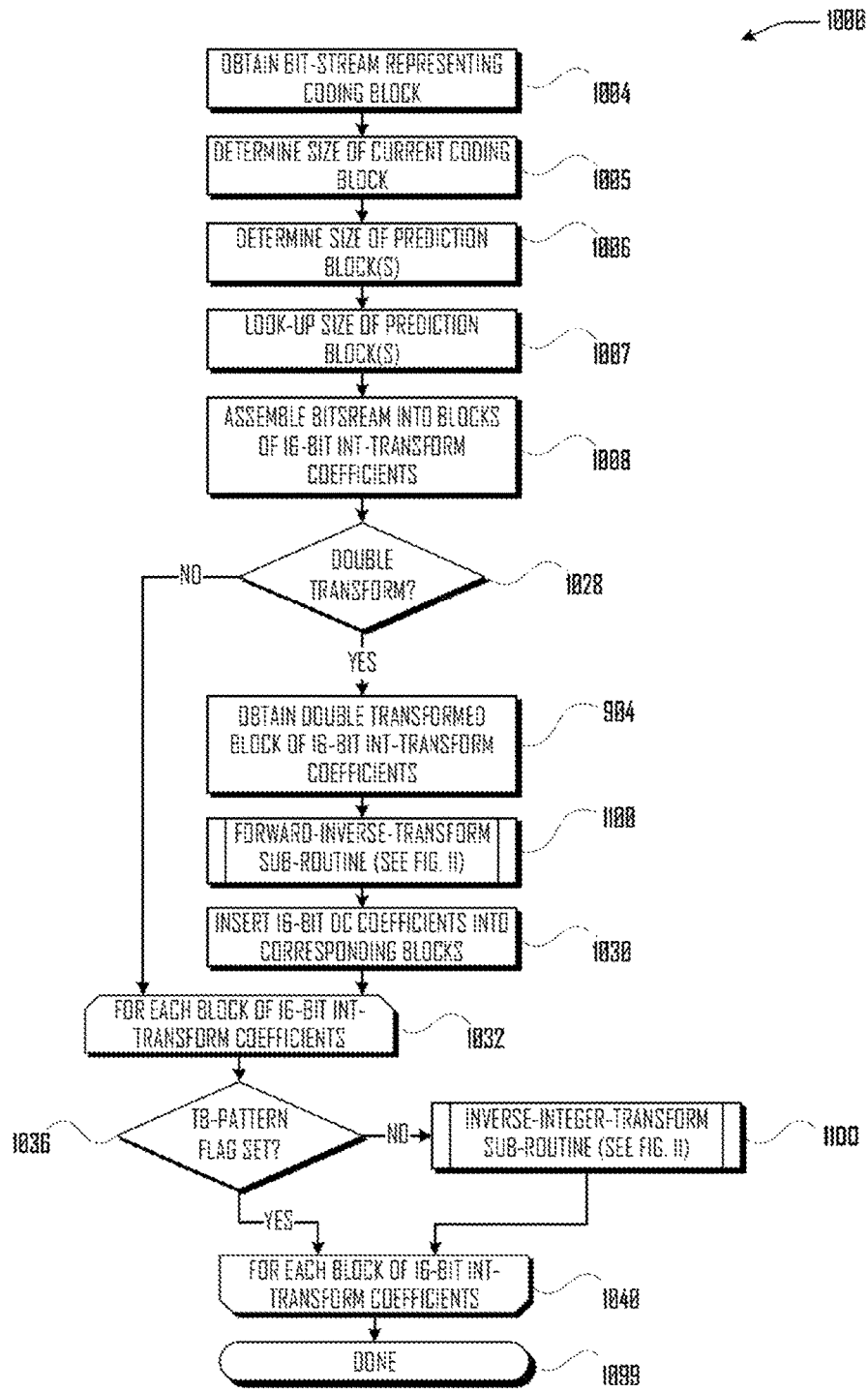
FIG. 10 illustrates a transform-block-recovery routine in accordance with at least one embodiment.

FIG. 10 illustrates a transform-block-recovery routine 1000 suitable for use with at least one embodiment, such as decoder 500. As will be recognized by those having ordinary skill in the art, not all events in the decoding process are illustrated in FIG. 10. Rather, for clarity, only those steps reasonably relevant to describing the transform-block-recovery routine 1000 are shown.

At execution block 1004, transform-block-recovery routine 1000 obtains a block of de-quantized transform coefficients, for example from inverse quantizer 512.

At execution block 1005, transform-block-recovery routine 1000 determines a size of the current coding block.

At execution block 1006, transform-block-recovery routine 1000 determines a size of the prediction block(s) used for motion prediction for the current coding block.

At execution block 1007, transform-block-recovery routine 1000 looks up the size of the prediction blocks for the corresponding combination of current coding block size and the size of the prediction block(s) used for motion prediction for the current coding block.

At execution block 1008, transform-block-recovery routine 1000 then assembles the de-quantized transform coefficients into one or more transform blocks of sixteen-bit integer-transform coefficients according to the transform block sizes obtained at execution block 1007, above.

At decision block 1028, if the transform blocks of the current coding block have not been double transformed, then transform-block-recovery routine 1000 proceeds to starting loop block 1032, described below. If the transform blocks of the current coding block have been double transformed (e.g., if they include a double-transformed block of sixteen-bit integer DC transform coefficients), then transform-block-recovery routine 1000 calls inverse-integer-transform sub-routine 1100 (described below in reference to FIG. 11) which performs an initial inverse transform operation on the double-transformed block of sixteen-bit integer-transform coefficients of the transform blocks of the current coding block and returns a corresponding block of intermediate sixteen-bit integer DC transform coefficients.

At execution block 1030, transform-block-recovery routine 1000 inserts the appropriate sixteen-bit integer DC transform coefficient into the corresponding block of sixteen-bit integer transform coefficients and proceeds to starting loop block 1032, described below.

Beginning at starting loop block 1032, transform-block-recover routine 1000 processes each transform block of sixteen-bit integer-transform coefficients in turn.

At decision block 1036, if the transform-block-pattern flag for the corresponding transform block is set in the transform block header, then at ending loop block 1040, transform-block-recovery routine 1000 iterates back to starting loop block 1032 to process the next block of sixteen-bit integer-transform coefficients of the current coding block (if any).

If, at decision block 1036, the transform-block-pattern flag for the corresponding transform block is not set in the transform block header, then transform-block-recovery routine 1000 calls inverse-transform sub-routine 1100 (described below in reference to FIG. 11), which returns a block of recovered residual values.

At ending loop block 1040, transform-block-recovery routine 1000 iterates back to starting loop block 1032 to process the next transform block of the current coding block (if any).

Transform-block-recovery routine 1000 ends at termination block 1099.

Inverse-Integer-Transform Sub-Routine

Figure 11:
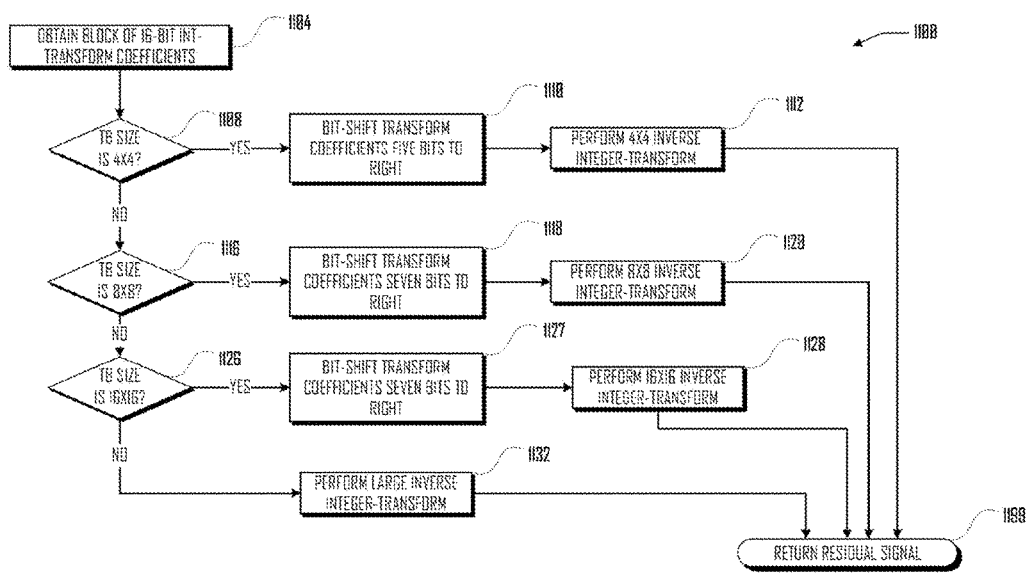
FIG. 11 illustrates an inverse-integer-transform sub-routine in accordance with at least one embodiment.

FIG. 11 illustrates an inverse-integer-transform sub-routine 1100 suitable for use with at least one embodiment, such as transform-block-recovery routine 1000.

At execution block 1104, inverse-integer-transform sub-routine 1100 obtains a transform block, for example from transform-block-recovery routine 1000.

At decision block 1108, if the transform block is a 4×4 transform block, then at execution block 1110, inverse-integer-transform sub-routine 1100 performs a 4×4 inverse-integer transform, for example the 4×4 inverse-integer transform described above. At execution block 1112, inverse-integer-transform sub-routine 1100 bit-shifts the resulting integer transform coefficients five bits to the right. Inverse-integer-transform sub-routine 1100 returns the bit-shifted integer transform coefficients at return block 1199.

Referring again to decision block 1108, if the transform block is not a 4×4 transform block, then inverse-integer-transform sub-routine 1100 proceeds to decision block 1116.

At decision block 1116, if the transform block is an 8×8 transform block, then at execution block 1118, inverse-integer-transform sub-routine 1100 performs an 8×8 inverse-integer transform, for example the 8×8 inverse-integer transform described above. At execution block 1120, inverse-integer-transform sub-routine 1100 bit-shifts the resulting integer transform coefficients seven bits to the right. Inverse-integer-transform sub-routine 1100 returns the bit-shifted integer transform coefficients at return block 1199.

Referring again to decision block 1116, if the transform block is not an 8×8 transform block, then inverse-integer-transform sub-routine 1100 proceeds to decision block 1126.

At decision block 1126, if the transform block is a 16×16 transform block, then at execution block 1127, inverse-integer-transform sub-routine 1100 performs a 16×16 inverse-integer transform, for example the 16×16 inverse-integer transform described above. At execution block 1128, inverse-integer-transform sub-routine 1100 bit-shifts the resulting integer-transform coefficients seven bits to the right. Inverse-integer-transform sub-routine 1100 returns the bit-shifted integer transform coefficients at return block 1199.

Referring again to decision block 1126, if the transform block is larger than a 16×16 transform block, for example a 32×32 or 64×64 transform block, then at execution block 1132, inverse-integer-transform sub-routine 1100 performs a large inverse-transform procedure. At return block 1199, inverse-integer-transform sub-routine 1100 returns the results of the large integer transform procedure.

Although specific embodiments have been illustrated and described herein, it will be appreciated by those of ordinary skill in the art that alternate and/or equivalent implementations may be substituted for the specific embodiments shown and described without departing from the scope of the present disclosure. This application is intended to cover any adaptations or variations of the embodiments discussed herein.

The invention claimed is:

1. A system comprising:
a memory configured to store computer instructions;
at least one processor configured to execute the computer instructions to cause the at least one processor to:
determine a maximum coding-block size defined by a maximum horizontal coding-block dimension and a maximum vertical coding-block dimension for an unencoded video frame;
determine a maximum-transform-block size defined by a maximum horizontal prediction-block dimension and a maximum vertical prediction-block dimension for the unencoded video frame;
encode the unencoded video frame based on the maximum coding-block size and the maximum-transform-block size to generate video data payload for an encoded bit-stream;
set a maximum coding-block-size flag in a frame header for the encoded bit-stream to zero unless the maximum horizontal coding-block dimension and the maximum vertical coding-block dimension both equal sixty-four pixels; and
set a maximum-transform-block-size flag in the frame header to zero unless the maximum horizontal prediction-block dimension and the maximum vertical prediction-block dimension are both greater than sixteen pixels.

2. A video-encoder-device-implemented method comprising:
- determining a maximum coding-block size for an unencoded video frame, the maximum coding-block size being defined by a maximum horizontal coding-block dimension and a maximum vertical coding-block dimension;
- encoding the unencoded video frame based on the maximum coding-block size to generate video data payload for an encoded bit-stream;
- generating a frame header for the encoded bit-stream, the frame header including a maximum coding-block-size flag; and
- setting the maximum coding-block-size flag to zero unless the maximum horizontal coding-block dimension and the maximum vertical coding-block dimension both equal sixty-four pixels.

3. The video-encoder-device-implemented method of claim 2, further comprising,
- determining a maximum-transform-block size for the unencoded video frame, the maximum-transform-block size being defined by a maximum horizontal prediction-block dimension and a maximum vertical prediction-block dimension;
- generating the frame header for the encoded bit-stream to include a maximum-transform-block-size flag;
- setting the maximum-transform-block-size flag to zero unless the maximum horizontal prediction-block dimension and the maximum vertical prediction-block dimension are both greater than sixteen pixels; and
- prior to encoding the unencoded video frame:
  - dividing the unencoded video frame into a plurality of coding-blocks including a first coding block that includes a horizontal coding-block dimension that is less than or equal to the maximum horizontal coding-block dimension and a vertical coding-block dimension that is less than or equal to the maximum vertical coding-block dimension;
  - dividing the first coding block into at least one prediction block that each includes a horizontal prediction-block dimension and a vertical prediction-block dimension;
  - dividing the first coding block into a plurality of transform blocks including a first transform block that includes a horizontal transform-block dimension that is less than or equal to the maximum horizontal prediction-block dimension and a vertical transform-block dimension that is less than or equal to the maximum vertical prediction-block dimension; and
  - wherein the horizontal transform-block dimension and the vertical transform-block dimension depend at least in part on the horizontal coding-block dimension, the vertical coding-block dimension, the horizontal prediction-block dimension, and the vertical prediction-block dimension.

4. The video-encoder-device-implemented method of claim 3, further comprising:
- for each corresponding transform block of the plurality of transform blocks, setting a corresponding transform-block-pattern flag in a transform-block header to a given first flag value in response to at least one transform coefficient in a set of transform coefficients for the corresponding transform block having a non-zero value and otherwise setting the corresponding transform-block-pattern flag to a given second flag value.

5. The video-encoder-device-implemented method of claim 4, further comprising:
- listing the corresponding transform-block-pattern flag for each corresponding transform block in raster scan order in the transform-block header.

6. The video-encoder-device-implemented method of claim 3, further comprising:
- determining, during the encoding of the unencoded video frame, that the horizontal transform-block dimension and the vertical transform-block dimension each equal four pixels, and consequently:
  - obtaining a first set of transform coefficients from the first transform block via a first transform;
  - obtaining a second set of transform coefficients from the first set of transform coefficients via shifting each of the first set of transform coefficients five bits to the right; and
  - obtaining a third set of transform coefficients from the second set of transform coefficients via a second transform.

7. The video-encoder-device-implemented method of claim 3, further comprising:
- determining, during the encoding of the unencoded video frame, that the horizontal transform-block dimension and the vertical transform-block dimension each equal eight pixels, and consequently:
  - obtaining a first set of transform coefficients from the first transform block via a first transform;
  - obtaining a second set of transform coefficients from the first set of transform coefficients via shifting each of the first set of transform coefficients two bits to the right;
  - obtaining a third set of transform coefficients from the second set of transform coefficients via a second transform; and
  - obtaining a fourth set of transform coefficients from the third set of transform coefficients via shifting each of the third set of transform coefficients two bits to the right.

8. The video-encoder-device-implemented method of claim 3, further comprising:
- determining, during the encoding of the unencoded video frame, that the horizontal transform-block dimension and the vertical transform-block dimension each equal sixteen pixels, and consequently:
  - obtaining a first set of transform coefficients from the first transform block via a first transform;
  - obtaining a second set of transform coefficients from the first set of transform coefficients via shifting each of the first set of transform coefficients two bits to the right;
  - obtaining a third set of transform coefficients from the second set of transform coefficients via a second transform; and
  - obtaining a fourth set of transform coefficients from the third set of transform coefficients via shifting each of the third set of transform coefficients two bits to the right.

9. A computing device, comprising:
- a memory that stores computer instructions;
- at least one processor that executes the computer instructions to cause the at least one processor to:
  - determine a maximum-transform-block size for an unencoded video frame, the maximum-transform-block size being defined by a maximum horizontal prediction-block dimension and a maximum vertical prediction-block dimension;

encode the unencoded video frame based on the maximum transform-block size to generate video data payload for an encoded bit-stream;

generate a frame header for the encoded bit-stream to include a maximum-transform-block-size flag; and set the maximum-transform-block-size flag to zero unless the maximum horizontal prediction-block dimension and the maximum vertical prediction-block dimension are both greater than sixteen pixels.

10. The computing device of claim 9, wherein the at least one processor is configured to execute the computer instructions to further cause the at least one processor to:

determine a maximum coding-block size for the unencoded video frame, the maximum coding-block size being defined by a maximum horizontal coding-block dimension and a maximum vertical coding-block dimension;

generate the frame header for the encoded bit-stream, the frame header including a maximum coding-block-size flag; and set the maximum coding-block-size flag to zero unless the maximum horizontal coding-block dimension and the maximum vertical coding-block dimension both equal sixty-four pixels.

11. The computing device of claim 10, herein the at least one processor is configured to execute the computer instructions to further cause the at least one processor to:

divide the unencoded video frame into a plurality of coding blocks including a first coding block that includes a horizontal coding-block dimension that is less than or equal to the maximum horizontal coding-block dimension and a vertical coding-block dimension that is less than or equal to the maximum vertical coding-block dimension;

divide the first coding block into at least one prediction block that each includes a horizontal prediction-block dimension and a vertical prediction-block dimension;

divide the first coding block into a plurality of transform blocks including a first transform block that includes a horizontal transform-block dimension that is less than or equal to the maximum horizontal prediction-block dimension and a vertical transform-block dimension that is less than or equal to the maximum vertical prediction-block dimension; and wherein the horizontal transform-block dimension and the vertical transform-block dimension depend at least in part on the horizontal coding-block dimension, the vertical coding-block dimension, the horizontal prediction-block dimension, and the vertical prediction-block dimension.

12. The computing device of claim 11, wherein the at least one processor is configured to execute the computer instructions to further cause the at least one processor to:

set the horizontal transform-block dimension and the vertical transform-block dimension to each equal eight pixels when the horizontal coding-block dimension, the vertical coding-block dimension, the horizontal prediction-block dimension, and the vertical prediction-block dimension each equal eight pixels.

13. The computing device of claim 11, wherein the at least one processor is configured to execute the computer instructions to further cause the at least one processor to:

set the horizontal transform-block dimension and the vertical transform-block dimension to each equal four pixels when the horizontal coding-block dimension and the vertical coding-block dimension each equal eight pixels and the horizontal prediction-block dimension and the vertical prediction-block dimension do not each equal eight pixels.

14. The computing device of claim 11, wherein the at least one processor is configured to execute the computer instructions to further cause the at least one processor to:

set the horizontal transform-block dimension and the vertical transform-block dimension to each equal sixteen pixels when the horizontal coding-block dimension, the vertical coding-block dimension, the horizontal prediction-block dimension, and the vertical prediction-block dimension each equal sixteen pixels.

15. The computing device of claim 11, wherein the at least one processor is configured to execute the computer instructions to further cause the at least one processor to:

set the horizontal transform-block dimension and the vertical transform-block dimension to each equal four pixels when the horizontal coding-block dimension and the vertical coding-block dimension each equal sixteen pixels and the horizontal prediction-block dimension and the vertical prediction-block dimension do not each equal sixteen pixels.

16. The computing device of claim 11, wherein the at least one processor is configured to execute the computer instructions to further cause the at least one processor to:

set the horizontal transform-block dimension and the vertical transform-block dimension to each equal sixteen pixels when the horizontal coding-block dimension and the vertical coding-block dimension are each greater than thirty-one pixels.

17. The computing device of claim 11, wherein the at least one processor is configured to execute the computer instructions to further cause the at least one processor to:

set the horizontal transform-block dimension and the vertical transform-block dimension to each equal four pixels when the horizontal coding-block dimension and the vertical coding-block dimension each equal eight pixels.

18. The computing device of claim 11, wherein the at least one processor is configured to execute the computer instructions to further cause the at least one processor to:

set the horizontal transform-block dimension and the vertical transform-block dimension to each equal eight pixels when the horizontal coding-block dimension, the vertical coding-block dimension, the horizontal prediction-block dimension, and the vertical prediction-block dimension each equal sixteen pixels.

19. The computing device of claim 11, wherein the at least one processor is configured to execute the computer instructions to further cause the at least one processor to:

set the horizontal transform-block dimension and the vertical transform-block dimension to each equal eight pixels when the horizontal coding-block dimension and the vertical coding-block dimension are each greater than thirty-one pixels.

\* \* \* \* \*